United States Patent Office
3,207,707
Patented Sept. 21, 1965

3,207,707
NITROGEN CONTAINING POLYMERS
Johann F. Klebe, Schenectady, N.Y., assignor to General Electric Company, a corporation of New York
No Drawing. Filed Apr. 29, 1963, Ser. No. 276,224
13 Claims. (Cl. 260—2)

This invention is concerned with nitrogen-containing polymers. More particularly, the invention relates to a nitrogen-containing polymer having essential units therein of the formula

I

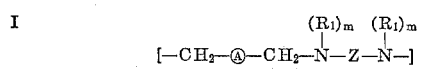

where $R_1$ is a member selected from the class consisting of hydrogen and monovalent hydrocarbon radicals, Ⓐ is a divalent residue of an aromatic nucleus, and the grouping

II

is a divalent organic radical selected from the class consisting of acyclic organic (e.g., saturated aliphatic hydrocarbon) radicals terminated by the two nitrogen atoms and cyclic organic (e.g., saturated aliphatic hydrocarbon) radicals contained the two nitrogens in the ring structure, with Z being a divalent organic, e.g. a saturated aliphatic hydrocarbon moiety, and $m$ is a whole number from 0 to 1. The invention also includes methods for making the aforesaid compositions of matter.

Among the organic radicals which $R_1$ may be are, for instance, alkyl radicals (e.g., methyl, ethyl, propyl, isopropyl, pentyl, octyl, dodecyl, etc., radicals); aryl radicals (e.g., phenyl, naphthyl, biphenyl, etc., radicals); aralkyl radicals (e.g., benzyl, phenyl-ethyl, etc., radicals); alkaryl radicals (e.g., xylyl, tolyl, ethylphenyl, methylnaphthyl, etc., radicals); cycloaliphatic (including unsaturated) radicals (e.g., cyclopentyl, cyclohexyl, cyclopentenyl, cyclohexenyl, etc., radicals); unsaturated aliphatic radicals (e.g., vinyl, allyl, methallyl, etc., radicals); etc. The presence of inert substituents on the organic radicals as, for instance, the nitro group, is not precluded.

Among the aromatic nuclei which A may represent as a divalent residue are, for instance, aromatic hydrocarbon residues based on, benzene, biphenyl, naphthalene, anthracene, toluene, xylene, ethylbenzene, diphenylmethane, diphenylethane, diphenyl oxide, diphenyl sulfide, etc. Again, the presence of inert substituents (in addition to the aliphatic or aromatic substitutions) on the aromatic nucleus are not precluded. It is intended that the two free valences of A are aromatic-based, specific examples of which are the phenylene radical (—$C_6H_4$—), the naphthalene radical, the biphenylene radical, etc. The position of each of the methylene groups attached to the divalent aryl nucleus of formula I may be varied in the ortho, meta or para-positions with the para position being the preferred arrangement.

When Z in the grouping

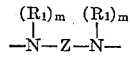

is acyclic, Z can be any saturated aliphatic hydrocarbon, for example, divalent radicals, such as methylene, ethylene (—$CH_2$—$CH_2$—), propylene [—($CH_2$)$_3$—], isopropylidene, butylene [—($CH_2$)$_4$—], hexamethylene, etc. When Z with the two nitrogens is a cyclic organic radical containing the nitrogens in the ring structure, such grouping can be, for example, the piperazyl radical of the formula

III

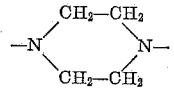

substituted piperazyl radicals as, for instance, alkyl-substituted derivatives, e.g., monomethyl- and dimethyl-substituted piperazyl radicals in which the alkyl groups, e.g., the methyl groups, can be ortho or para to each other or, if more than two alkyl groups are present, they can be symmetrical, asymmetrical or vicinal in their relationship to each other. Such compositions would have the formula

IV

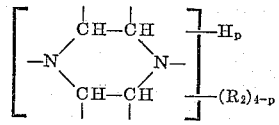

where $R_2$ is a monovalent hydrocarbon radical, and $p$ is a whole number from 0 to 4, inclusive. With respect to Z alone, when it is part of a saturated cyclic aliphatic hydrocarbon radical containing the two nitrogen atoms, Z can be, for instance, the divalent ethylene radical, both the methylene radical and the higher alkylene radicals, such as the pentamethylene radical when the two nitrogens are closer together in the ring, etc. Furthermore, it should be recognized that when $m$ is 1, it will be in connection with the grouping of the formula

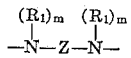

being acyclic, while when $m$ is 0, it will be in connection with the latter grouping being cyclic.

The above compositions of matter can be prepared by reacting a bis-(halomethyl)aryl compound of the formula

V
$$X—CH_2—Ⓐ—CH_2—X$$

with a triorganosilylamine of the formula

VI

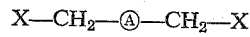

where $R_1$ and $R_2$ have the above meanings, $R_3$ and $R_4$ are the same as $R_2$, and A, Z, and $m$ have the meanings given above, and X is a halogen, for instance, chlorine, bromine, fluorine, etc. When a dihalide of Formula V is reacted with the triorganosilylamine of Formula VI, the polymer corresponding to Formula I is obtained together with a triorganosilylhalide of the formula

VII

where $R_2$, $R_3$, $R_4$, and X have the meanings recited above.

The triorganosilylamines of Formula VI can be conveniently prepared by reacting the triorganohalogenosilane of Formula VII with a diamino compound of the formula

VIII

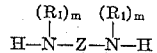

where $R_1$ and Z have the meanings given above. Among the triorganohalogenosilanes which may be used in preparing compositions of the Formula VI are, for example, trimethylchlorosilane, triphenylchlorosilane, triethylbromosilane, dimethylethylchlorosilane, methyldiphenylbromosilane, tribenzylchlorosilane, etc.

Among diamino compounds of Formula VIII which may be employed are, for instance, ethylenediamine, propylenediamine, isopropylidenediamine, N,N'-dimethylethylenediamine, N,N'-diphenylethylenediamine, N-methyl, N'-phenyl-ethylene diamine, N,N'-dibenzyl-hexamethylenediamine, etc.

Among the cyclic dinitrogen compounds corresponding to Formula VIII may be mentioned piperazine, methylpiperazine, 2,5-dimethylpiperazine, ethylpiperazine, cyanopiperazine, piperazinedione (diketopiperazine), pyrazolidine, (tetrahydropyrazole), pyrazolidone, $\Delta^3$-pyrazoline, (dihydropyrazole), 2,5-diamino-1,3-pyrimidine, etc.

The methods for preparing compositions of Formula VI generally involve adding at least 2 moles of the triorganosilyl halide per mole of the diamino compound of Formula VIII. The reaction is advantageously carried out in a solvent, for instance, such inert solvents as dioxane, diethyl ether, benzene, toluene, etc., at temperatures from slightly above room temperature up to the reflux temperature of the mass. The reaction is carried out in the presence of a hydrohalide acceptor, for instance, tertiary amines, e.g., pyridine, triethylamine, etc. Thereafter, the precipitate of the hydrohalide of the hydrohalide acceptor and the solvent are removed, and the remaining product fractionally distilled to obtain the triorganosilylamine of Formula VI.

Bis-(halomethylene) aryl compounds of Formula V are readily available and directions for preparing these compositions are found in the literature. Among such dihalides which may be employed in the practice of the present invention (either in the ortho, meta or para positions) are, for example, bis-(chloromethyl)benzene, bis-(bromomethyl)benzene, bis-(chloromethyl)biphenyl, etc.; bis-4,4'-(chloromethyl)diphenyloxide (each of the chloromethyl groups is in the para position), bis-(bromomethyl)diphenylmethane (where each of the chloromethyl groups is in the para position, although the presence of these chloromethyl groups in the ortho, ortho' or meta, meta', or other positions on the aromatic nucleus is not precluded), etc.

The preparation of the polymer corresponding to Formula I can be carried out in any convenient method whereby one is able to cause cleavage of the triorganosilyl group with accompanying satisfaction of the remaining valences of the silicons by the halogen on the bis-(halomethyl)aryl compound. Generally, it is merely necessary to bring the bis-(halomethyl)aryl compound into contact with the triorganosilylamine of Formula VI and to heat the reactants at a temperature of from about 50–200° C. or below the decomposition point of either the reactants or the polymer, for a time sufficient to effect the desired polycondensation of the reactants. It will of course be apparent to those skilled in the art that the use of solvents is not precluded and one can advantageously employ solvents, such as benzene, toluene, xylene, tetrachloroethane, etc. The time of heating can be varied widely but may range from about 50 minutes to as long as 5–10 hours or more depending on the reactants employed, the degree of condensation desired, etc. Pressures other than atmospheric pressure are ordinarily not required although superatmospheric pressures can be used under certain circumstances where it is desired to increase the rate of reaction. Throughout the reaction, anhydrous conditions should be maintained. For maximum molecular weight, the molar concentrations of the bis-(halomethyl)aryl compound should be essentially equal to the molar concentration of the triorganosilylamine. As the molar concentration of each of these two reactants increases over the other, lower molecular weight products will be obtained and instead of solid products it is possible by this method to obtain fluids or low melting products.

Although as pointed out above, the reaction between the bis-(halomethyl)aryl compound and the triorganosilylamine compound can proceed without the necessity of a catalyst, I have found that this reaction can be accelerated by the presence of certain agents, for example, ammonium salts such as ammonium sulfate, ammonium chloride; salts of organic amines, for example, triethyl amine hydrochloride, pyridine hydrochloride, pyridine sulfate, etc.; inorganic alkali salts, for example sodium bisulfate, sodium hydrogen phosphate, potassium bisulfate, etc.; Lewis acids, for instance $BF_3$, $P_2O_5$, zinc chloride, zinc acetate, etc. The presence of highly polar fluids, for example dimethylformamide, dimethylacetamide, N-methylpyrrolidone, dimethyl sulfoxide, tetramethylene sulfone, etc., also aids in accelerating the reaction. These catalysts can be employed in amounts ranging from about 0.001 to about 1 to 2 percent, by weight, based on the total weight of the reactants. Preferably, these catalytic agents are present in amounts ranging from about 0.1 to 1 percent, by weight.

In order that those skilled in the art may better understand the present invention and how it may be practiced, the following examples are given by way of illustration and not by way of limitation. All parts are by weight.

*Example 1*

The triorganosilyl derivative of cis-2,5-dimethylpiperazine having the formula

IX
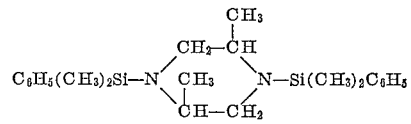

was prepared as follows. 57 grams (0.5 mole) cis-2,5-dimethylpiperazine was dissolved in 1 liter of dry diethyl ether and to the solution was added with stirring 170 grams (1 mole) of phenyldimethylchlorosilane over a period of 30 minutes at room temperature. After completion of the addition, the mixture was heated at the reflux temperature of the mass for about one hour, and thereafter 110 grams (1.1 moles) triethylamine was added and refluxing of the stirred mixture continued for about 15 hours. The solid triethylamine hydrochloride obtained was removed by filtration and the filtrate was distilled to yield the above-described triorganosilyl derivative of Formula IX boiling at 206° C./2.8 mm. and having a refractive index of $n_D^{20}$ 1.5425. Analysis of this composition showed it to contain 68.9 percent carbon and 8.9 percent hydrogen as compared to the theoretical values of 69.0 percent carbon and 9.0 percent hydrogen.

*Example 2*

In order to prepare a polymer from the triorganosilyl derivative described in Example 1, 7.66 parts of the silylamine of Formula IX was mixed with 3.5 parts of $\alpha,\alpha'$-dichloro-p-xylene and heated in an oil bath under a nitrogen atmosphere to 200° C. for approximately 3 hours, during which time the mixture became very viscous. Thereafter, a vacuum of 0.1 mm. at 200° C. was applied to the reaction mixture and the dimethylphenylchlorosilane which had cleaved was removed over a period of several hours. The remaining product when cooled to room temperature was a solid polymer which had an intrinsic viscosity in chloroform /$\eta$/ of 0.77, and a molecular weight of 15,600. Analysis of the polymer showed that it contained 76.3 percent carbon, 9.5 percent hydrogen, and 12.6 percent nitrogen as contrasted to theoretical values of 77.8 percent carbon, 9.3 percent hydrogen, and 12.9 percent nitrogen. This polymer was composed of the recurring unit X
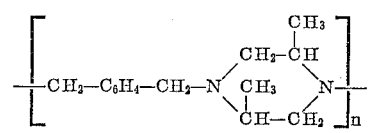

where $n$ is a number greater than 1, e.g., 2 to 1000 or more.

Example 3

The triorganosilyl derivative of transdimethylpiperazine was prepared similarly as in Example 1 with the exception that trans-2,5-dimethylpiperazine was reacted with dimethylphenylchlorosilane in place of the cis derivative of Example 1. This trans derivative had the formula XI
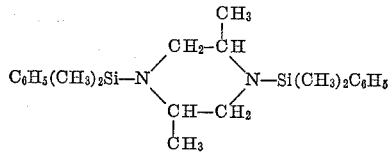

The trans triorganosilyl derivative of Formula XI boiled at 206° C./2.5 mm. and had a refractive index $n_D^{20}$ 1.5401. Analysis of the product showed it to contain 68.8 percent carbon and 8.9 percent hydrogen as contrasted to the theoretical values of 69.0 percent carbon and 9.0 percent hydrogen. A polymer from this derivative was prepared similarly as was done in Example 2 employing the same conditions and proportions of ingredients as in Example 2 by condensing the triorganosilylamine of Formula XI with α,α′-dichloro-p-xylene to give a solid polymer composed essentially of recurring units of the formula XII
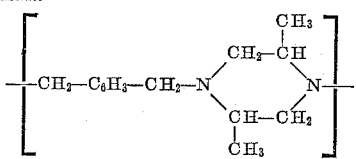

Example 4

The trimethylsilyl derivative of cis-2,5-dimethylpiperazine was prepared similarly as was done in Example 1 with the exception that trimethylchlorosilane was substituted for the dimethylphenylchlorosilane of Example 1. The trimethylsilyl derivative boiled at 112° C./11 mm. and had a refractive index $n_D^{20}$ 1.4563. This trimethylsilylpiperazine was then condensed with α,α′-dichloro-p-xylene in the same manner as in Example 2 to give a polymer having the same recurring unit as Formula X.

Example 5

The trimethylsilyl derivative of trans-2,5-dimethylpiperazine was prepared similarly as in Example 3 with the exception that trimethylchlorosilane was substituted for the dimethylphenylchlorosilane used in Example 3. The trimethylsilyl derivative of the trans dimethylpiperazine boiled at 112° C./11 mm. and had a refractive index of $n_D^{20}$ 1.4522. Again, a solid polymer was prepared similarly as in Example 3 and having the same recurring unit of Formula XII using the latter trimethylsilyl derivative with the α,α′-dichloro-p-xylene.

Example 6

Bis-N,N′-(phenyldimethysilyl)-2-methylpiperazine was prepared similarly as in Example 1 with the exception that 2-methylpiperazine was substituted in place of the cis-2,5-dimethylpiperazine of Example 1. About 36.87 parts of this phenyldimethylsilyl methylpiperazine was reacted with 17.5 parts of α,α′-dichloro-p-xylene under anhydrous conditions in the presence of 0.2 gram ammonium chloride at 150° C. for 4 to 6 hours under a dry nitrogen atmosphere to yield a high viscosity fluid. Substantially complete removal of the phenyldimethylchlorosilane cleaved during the reaction was effected by heating the resinous composition at 150° C. and 0.1 mm. pressure for about 10 hours. The solid polymer thus obtained was dissolved in chloroform, filtered and thereafter poured into ethanol to effect precipitation of the polymer in the form of white fibers. This polymer had an intrinsic viscosity in chloroform of 1.97 and a molecular weight of about 40,600. Analysis of this compound showed it to contain 76.5 percent carbon, 9.2 percent hydrogen, and 13.7 percent nitrogen as contrasted to the theoretical values of 77.2 percent carbon, 9.0 percent hydrogen and 13.8 percent nitrogen. A film cast from a chloroform solution of this polymer showed a tensile strength of 9,880 p.s.i. and a percent elongation at break of 95 percent.

Example 7

N,N′-bis-dimethylphenylsilyl-N,N′-dimethylethylenediamine having the formula

XIII
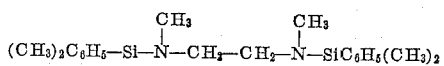

was prepared by dissolving 30 grams of N,N′-dimethylethylenediamine in 50 cc. dry benzene and adding this solution (cooled by ice) to 74 grams of dimethylphenylchlorosilane in 150 cc. dry benzene. After the addition was complete, 70 grams of triethylamine was added and the mixture stirred for about 15 hours. The precipitated triethylaminehydrochloride was then filtered off and the filtrate was distilled to obtain the above compound of Formula XIII, boiling at 184–5° C./2.6 mm. and having a refractive index $n_D^{20}$ 1.5294. Analysis of the compound showed it to contain 67.8 percent carbon and 9.1 percent hydrogen as contrasted to the theoretical values of 67.4 percent carbon and 9.0 percent hydrogen. A polymer was prepared from this methylphenylsilylethylenediamine by reacting the latter with α,α′-dichloro-p-xylene in the same manner and using the same proportions of ingredients as in Example 2 with the exception that the triorganosilylamine of Formula XIII was used in place of that employed in Example 2. There was thus obtained a solid polymer which was composed of the recurring unit.

XIV
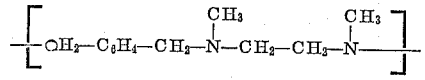

Example 8

In this example, N,N′-bis-dimethylphenylsilyl-N,N′-diphenylethylenediamine was prepared similarly as in Example 7 with the exception that N,N′-diphenylethylenediamine was used in place of the N,N′-dimethylethylenediamine. There was thus obtained the desired N,N′-bis-dimethylphenylsilyl-N,N′-diphenylethylenediamine boiling at 240–6° C./2.9 mm. and melting at 97–98° C. This compound, when reacted with α,α′-dichloro-p-xylene as above in Example 2, gave a polymer which was a solid at room temperature and had recurring units of the formula

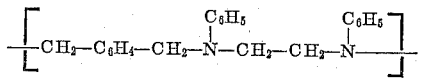

Example 9

About 2 grams of a polymer of the recurring structural unit of formula

XV
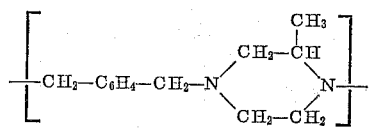

obtained by reacting α,α′-dichloro-p-xylene and N,N′-bistrimethylsilyl-2-methylpiperazine (which boiled at 106° C./11 mm. and had a refractive index $n_D^{20}$ 1.4516), specifically poly(1,4-xylylenyl-2-methylpiperazine), was dissolved in 25 cc. chloroform and to the solution was added 0.7 gram (0.005 mole) methyl iodide and 25 cc. ethanol. The mixture was allowed to stand at room temperature for 48 hours. The viscous oil that separated was dissolved in dimethyl formamide and the product purified by precipitation with ethanol. This solid polymeric quaternary amine composed of the recurring unit

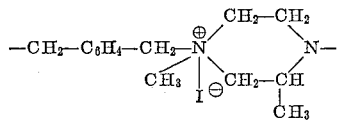

was converted into a film by dissolving it in dimethylformamide and thereafter casting the film and slowly evaporating the solvent. The dry film was placed in n-propanol containing 1,3-diiodopropane in a ratio of 0.2–0.5 iodine per nitrogen in the polymer. The propanol was heated at 95° C. for 12 hours, the film was washed in ethanol and placed in a 1 percent sodium hydroxide solution at 80–90° C. for about 1 hour in order to exchange the iodide for the hydroxide ion. The sodium hydroxide solution was then replaced by hot distilled water and after some swelling had occurred the sodium hydroxide treatment was repeated. Finally, the film was washed thoroughly with hot distilled water. Such a film has use as an ion exchange resin membrane.

It will of course be apparent to those skilled in the art that in addition to the conditions or intermediate ingredients which have been employed above for making the polymers, other conditions and ingredients can be employed without departing from the scope of the invention. The particular dihalide used can also be varied and in addition to the $\alpha,\alpha'$-dichloro-p-xylene, one can use other dihalides, many examples of which have been given above.

Many catalysts suitable for accelerating the polymer-forming reaction, in addition to ammonium chloride, may be employed within the scope of the claims. I have found that the addition of such catalytic materials allows lower reaction temperatures and leads to polymers of higher molecular weight than those obtained in the absence of the catalyst.

The polymers herein disclosed and claimed are difficultly soluble in most solvents. However, they can be dissolved readily in chloroform or other chlorinated aliphatic hydrocarbons, such as ethylene dichloride to form solutions which can be cast into films which are readily obtained by evaporation of the solvent. These films have utility for packaging and in protective applications. They have high tensile strengths and are extremely flexible even at temperatures of well above 100° C. Films of these polymers can be used as slot liners in motors; they can also be used as insulation for insulated conductors.

Acids dissolved in the polymer lead to the formation of polyelectrolyte solutions. Films of good mechanical strength cast from such acidic solutions (using e.g., formic acid, acetic acid, etc.) are water-soluble in contrast to the completely water-insoluble parent polyamines.

The composition herein claimed may be used as flexible or rigid diaphragms which are resistant to moisture and solvents. Suitable solvent-resistant hose and flexible tubing may be prepared by extrusion methods. Because of their negative temperature coefficients, these polymers can be used as thermostatic materials in applications requiring such properties. The composition may also be mixed with other polymers, for instance, polyamide resins, Buna-N rubbers, etc., to make products useful as wire insulation.

Various fillers and modifiers may be added, among which may be mentioned, for instance, carbon black, zinc oxide, aluminum oxide, celite, asbestos, magnesium carbonate, mica, glass, etc. Such fillers may be added in amounts ranging, by weight, from 0.1 to 200 parts of filler per part of polymer. Suitable plasticizers may be added as may extenders of resins, for example, cumar, indene, and cumar-indene resins.

What I claim as new and desire to secure by Letters Patent of the United States is:

1. A polymeric composition in which the recurring units are essentially units of the formula

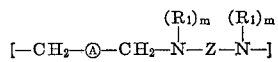

where $R_1$ is a member selected from the class consisting of hydrogen and monovalent hydrocarbon radicals, Ⓐ is a divalent residue of an aromatic nucleus, and the grouping

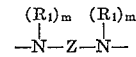

is a divalent organic radical selected from the class consisting of acyclic saturated aliphatic hydrocarbon radicals terminated by the two nitrogen atoms and cyclic saturated aliphatic hydrocarbon radicals containing only the two nitrogens in the ring structure with Z being a divalent saturated aliphatic hydrocarbon moiety, and $m$ is a whole number from 0 to 1.

2. A composition of matter composed essentially of units of the formula

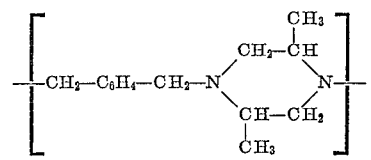

3. A composition of matter composed essentially of units of the formula

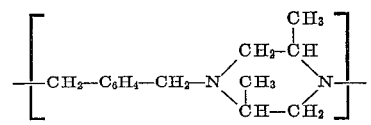

4. A composition of matter composed essentially of units of the formula

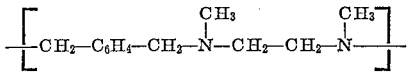

5. A composition of matter composed essentially of units of the formula

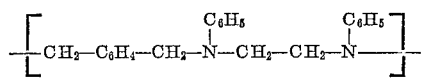

6. A composition of matter composed essentially of units of the formula

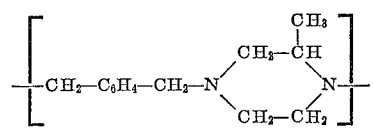

7. The process for making polymers of the formula

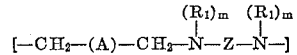

which comprises effecting reaction between a compound of the formula

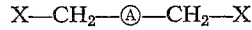

with a trihydrocarbon-substituted silyl amine of the formula

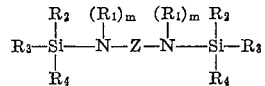

where $R_1$ is a member selected from the class consisting of hydrogen and monovalent hydrocarbon radicals, $R_2$, $R_3$, and $R_4$ are monovalent hydrocarbon radicals, X is a halogen, Ⓐ is a divalent residue of an aromatic nucleus, and the grouping

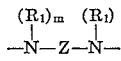

is a divalent organic radical selected from the class consisting of acyclic saturated aliphatic hydrocarbon radicals terminated by the two nitrogen atoms and cyclic saturated aliphatic hydrocarbon radicals containing only the two nitrogens in the ring structure, with Z being a divalent saturated aliphatic hydrocarbon moiety, and $m$ is a whole number from 0 to 1.

8. The process which comprises reacting α,α'-dichloro-p-xylene with a bis-(trihydrocarbon-substituted silyl) derivative of cis-2,5-dimethylpiperazine to obtain a polymeric composition having the recurring unit

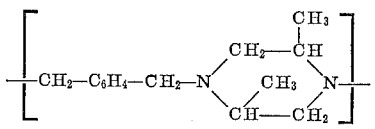

9. The process which comprises reacting α,α'-dichloro-p-xylene with a bis-(trihydrocarbon-substituted silyl) derivative of trans-2,5-dimethylpiperazine to obtain a polymeric composition having the recurring unit

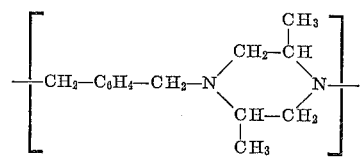

10. The process which comprises effecting reaction between α,α'-dichloro-p-xylene with a bis-(trihydrocarbon-substituted silyl) derivative of 2-methylpiperazine to obtain a polymeric composition containing the recurring unit

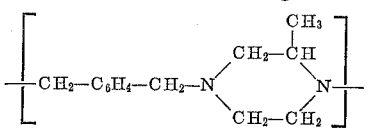

11. The process which comprises effecting reaction between α,α'-dichloro-p-xylene with a bis-(trihydrocarbon-substituted silyl) derivative of N,N'-dimethylethylenediamine to obtain a polymeric composition containing the recurring unit

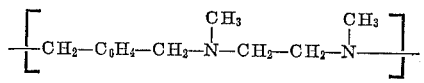

12. The process which comprises effecting reaction between α,α'-dichloro-p-xylene with a bis-(trihydrocarbon-substituted silyl) derivative of N,N'-diphenylethylenediamine to obtain a polymeric composition containing the recurring unit

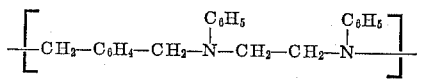

13. The process as in claim 7 in which the reaction is carried out in the presence of a catalytic material selected from the class consisting of ammonium salts, salts of organic amines, alkali-metal salts, Lewis acids, and polar solvents.

References Cited by the Examiner

UNITED STATES PATENTS

| | | | |
|---|---|---|---|
| 2,261,002 | 10/41 | Ritter | 260—2 |
| 2,723,244 | 11/55 | Joyce et al. | 260—2 |
| 2,912,390 | 11/59 | Jaruzelski | 260—2 |
| 3,071,617 | 1/63 | Hass | 260—2 |
| 3,127,359 | 3/64 | Kramer et al. | 260—2 |

OTHER REFERENCES

Fieser et al.: "Organic Chemistry," D. C. Heath & Co., Boston, published 1944, pp. 229–230 and 238–240.

MURRAY TILLMAN, *Primary Examiner.*

SAMUEL H. BLECH, *Examiner.*